United States Patent
Goto (10) Patent No.: US 10,907,683 B2
(45) Date of Patent: Feb. 2, 2021

(54) HALF THRUST BEARING FOR CRANKSHAFT OF INTERNAL COMBUSTION ENGINE

(71) Applicant: DAIDO METAL COMPANY LTD., Nagoya (JP)

(72) Inventor: Shiho Goto, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 16/734,585

(22) Filed: Jan. 6, 2020

(65) Prior Publication Data
US 2020/0256383 A1    Aug. 13, 2020

(30) Foreign Application Priority Data

Feb. 8, 2019    (JP) ................. 2019-021307

(51) Int. Cl.
*F16C 33/04*     (2006.01)
*F16C 17/04*     (2006.01)
*F16C 9/02*      (2006.01)

(52) U.S. Cl.
CPC .............. *F16C 33/046* (2013.01); *F16C 9/02* (2013.01); *F16C 17/04* (2013.01)

(58) Field of Classification Search
CPC ........ F16C 17/04; F16C 17/10; F16C 33/046; F16C 9/02; F16C 2360/22; F02F 7/0053
See application file for complete search history.

(56) References Cited

U.S. PATENT DOCUMENTS

| | | | |
|---|---|---|---|
| 4,175,801 A * | 11/1979 | Coil .................. | F16C 9/02 384/429 |
| 2005/0223546 A1* | 10/2005 | Klier ................. | F16C 17/10 29/724 |
| 2014/0233874 A1* | 8/2014 | Tanaka .............. | F16C 9/02 384/294 |
| 2015/0323001 A1* | 11/2015 | Carter .............. | F16C 33/208 384/291 |
| 2016/0032961 A1* | 2/2016 | Tanaka .............. | F16C 9/02 123/192.2 |
| 2016/0169271 A1* | 6/2016 | Tanaka .............. | F16C 17/04 384/294 |
| 2017/0167530 A1* | 6/2017 | Tanaka .............. | F16C 17/04 |

(Continued)

FOREIGN PATENT DOCUMENTS

JP    H11-201145 A    7/1999

*Primary Examiner* — Alan B Waits
(74) *Attorney, Agent, or Firm* — Snyder, Clark, Lesch & Chung, LLP (57) ABSTRACT

A half thrust bearing includes a back metal layer, a bearing alloy layer defining a slide surface, and two thrust relieves formed adjacent to both circumferential end surfaces of the half thrust bearing and each including a thrust relief surface. The back metal layer includes an exposed end face configuring at least a part of the circumferential end surface, an exposed slant surface configuring at least a part of the thrust relief surface, and a transition surface formed between the exposed end face and the exposed slant surface. The transition surface is covered with a cover member including a cover end surface configuring at least a part of the circumferential end surface and a cover slant surface configuring at least a part of the thrust relief surface.

7 Claims, 8 Drawing Sheets

(56) References Cited

U.S. PATENT DOCUMENTS

2018/0355907 A1* 12/2018 Sakurai ................ F16C 17/102
2019/0195272 A1*  6/2019 Amano ................ F16C 17/045
2019/0226520 A1*  7/2019 Forder .................... F16C 17/10
2020/0256383 A1*  8/2020 Goto ..................... F16C 33/125

* cited by examiner

HALF THRUST BEARING FOR CRANKSHAFT OF INTERNAL COMBUSTION ENGINE

BACKGROUND OF THE INVENTION

(1) Field of the Invention

The present invention relates to a half thrust bearing which receives axial force of a crankshaft of an internal combustion engine.

(2) Description of Related Art

A crankshaft of an internal combustion engine is rotatably supported at a journal portion thereof by a cylinder block bottom part of the internal combustion engine via a main bearing configured by combining a pair of half bearings into a cylindrical shape.

One or both of the pair of half bearings are used in combination with a half thrust bearing which receives axial force of a crankshaft. The half thrust bearing is disposed at one or both of axial end surfaces of the half bearing.

The half thrust bearing receives the axial force generated in the crankshaft. That is, the half thrust bearing is disposed for the purpose of bearing the axial force input to the crankshaft, e.g. when the crankshaft and a transmission are connected to each other by a clutch.

A thrust relief is formed on a slide surface side of the half thrust bearing in the vicinity of each circumferential end of the half thrust bearing in such a way that a thickness of a bearing member becomes smaller toward a circumferential end surface of the half thrust bearing. Generally, the thrust relief is formed in such a way that its length from the circumferential end surface of the half thrust bearing to a slide surface and its depth in the circumferential end surface become constant independently of radial positions. The thrust relief is formed in order to absorb misalignment of the end surfaces of the pair of half thrust bearings when the half thrust bearings are put together in a split-type bearing housing (see FIG. 10 of JP H11-201145 A).

The crankshaft of the internal combustion engine is supported, at the journal portion thereof, by the cylinder block bottom part of the internal combustion engine via the main bearing composed of the pair of half bearings. In this instance, lubrication oil is fed from an oil gallery in a cylinder block wall into a lubrication oil groove formed along an inner peripheral surface of the main bearing through a through-hole in a wall of the main bearing. The lubrication oil is supplied into the lubrication oil groove of the main bearing in this way, and then supplied to the half thrust bearing. It should be noted that a laminated structure in which an aluminum bearing alloy layer or a copper bearing alloy layer are formed on one surface of a back metal layer made of an Fe alloy is generally used for the thrust bearing which receives the axial force of the crankshaft of the internal combustion engine.

BRIEF SUMMARY OF THE INVENTION

If the axial force input to the crankshaft by coupling the crankshaft with a transmission or the like is applied to the slide surface of the half thrust bearing, impact force is substantially simultaneously applied to the proximity of the circumferential end surfaces of the half thrust bearing, and therefore fatigue (cracks and/or peeling) may occur in the thrust relief or the bearing alloy layer of the slide surface adjacent to the thrust relief.

More specifically, the half thrust bearing is used by being fitted to a bearing seat (seat surface) provided in side surfaces of a cylinder block and a bearing cap. However, since an inside diameter of the bearing seat is formed slightly larger than an outside diameter of the half thrust bearing, the half thrust bearing is slightly movable in a circumferential direction. On the other hand, when a pair of the half thrust bearings are used by being combined into an annular shape (e.g., see FIG. 10 of JP H11-201145 A), a thrust collar surface of the crankshaft tends to first contact the slide surface of one of the half thrust bearings instead of simultaneously contacting both slide surfaces of the pair of half thrust bearings, and a momentary axial force from the crankshaft is input to the slide surface of the thrust bearing. Thus, one of the half thrust bearings slightly moves in the circumferential direction in accordance with rotation of the thrust collar surface, a circumferential end surface of one of the half thrust bearings on a forward side of a rotation direction of the crankshaft collides with a circumferential end surface of the other half thrust bearing on a backward side of the rotation direction of the crankshaft, and impact load is applied to the proximity of the circumferential end surfaces of the half thrust bearings. The fatigue (cracks or peeling from a steel back metal layer) tends to occur in the thrust relief adjacent to the circumferential end surface of the half thrust bearing or the bearing alloy layer of the slide surface adjacent to the thrust relief due to an effect of the impact load repeatedly applied whenever the crankshaft and the transmission are connected to each other.

Therefore, an object of the present invention is to provide a half thrust bearing for a crankshaft of an internal combustion engine in which the fatigue does not easily occur during operation.

In order to achieve the above-described object, the present invention provides a semi-annularly shaped half thrust bearing for receiving axial force of a crankshaft of an internal combustion engine, the half thrust bearing including a back metal layer made of an Fe alloy that includes a first surface and a second surface parallel to the first surface, and a bearing alloy layer provided on the first surface of the back metal layer that defines a slide surface of the half thrust bearing to be parallel to the first surface, the half thrust bearing further including two thrust reliefs formed adjacent to both circumferential end surfaces of the half thrust bearing, each thrust relief including a thrust relief surface formed so that a wall thickness of the half thrust bearing becomes smaller from the slide surface toward the circumferential end surface, wherein the back metal layer further includes an exposed end face forming at least a part of the circumferential end surface of the half thrust bearing, an exposed slant surface extending to incline from the first surface and forming at least a part of the thrust relief surface, and a transition surface formed between the exposed end face and the exposed slant surface, and the transition surface is covered with a cover member made of the same bearing alloy as the bearing alloy layer, the cover member including a cover end surface forming at least a part of the circumferential end surface of the half thrust bearing, and a cover slant surface forming at least a part of the thrust relief surface.

The bearing alloy layer may include a bearing alloy slant surface extending to incline from the slide surface and forming at least a part of the thrust relief surface.

The bearing alloy slant surface, the exposed slant surface, and the cover slant surface may extend at least partly in the same plane, and the exposed end face and the cover end surface may extend at least partly in the same plane.

Preferably, an axial length (A1) of the cover end surface in the circumferential end surface of the half thrust bearing may be 0.2 to 1.5 mm.

Preferably, an axial depth (RD1) of the thrust relief from the slide surface in the circumferential end surface of the half thrust bearing may be constant between a radially inner end and a radially outer end of the half thrust bearing, and 0.1 to 1 mm.

Preferably, a length (L1) of the thrust relief from the circumferential end surface of the half thrust bearing may be constant between a radially inner end and a radially outer end of the half thrust bearing, and 3 to 25 mm.

Furthermore, at least the slide surface may be covered with an overlay layer.

As described above, the half thrust bearing for the crankshaft receives the axial force of the crankshaft of the internal combustion engine. According to the present invention, a cover member is provided partly in the circumferential end surface, i.e., the transition surface of the back metal layer is covered with the cover member made of the same material as a bearing alloy layer. Therefore, on a thrust relief surface side of the circumferential end surface of the half thrust bearing, the cover member made of the bearing alloy first receives impact load and is elastically deformed so that the load applied to the back metal layer is eased. On the other hand, on a rear surface side (a side opposite to the thrust relief surface) of the circumferential end surface of the half thrust bearing, the exposed end face of the back metal layer which is less easily elastically deformed than the cover member is exposed so that the impact load is mainly applied to the region (i.e., the exposed end face of the back metal layer) of the circumferential end surface that is located apart from the cover member. Therefore, the impact load is not easily propagated to the bearing alloy layer below the slide surface adjacent to the thrust relief surface or the thrust relief, so that fatigue does not easily occur in the bearing alloy layer in these regions.

DETAILED DESCRIPTION OF THE INVENTION

Hereinafter, embodiments of the present invention will be described with reference to the drawings.

Embodiment 1

(Overall Configuration of Bearing Device)

Figure 1:
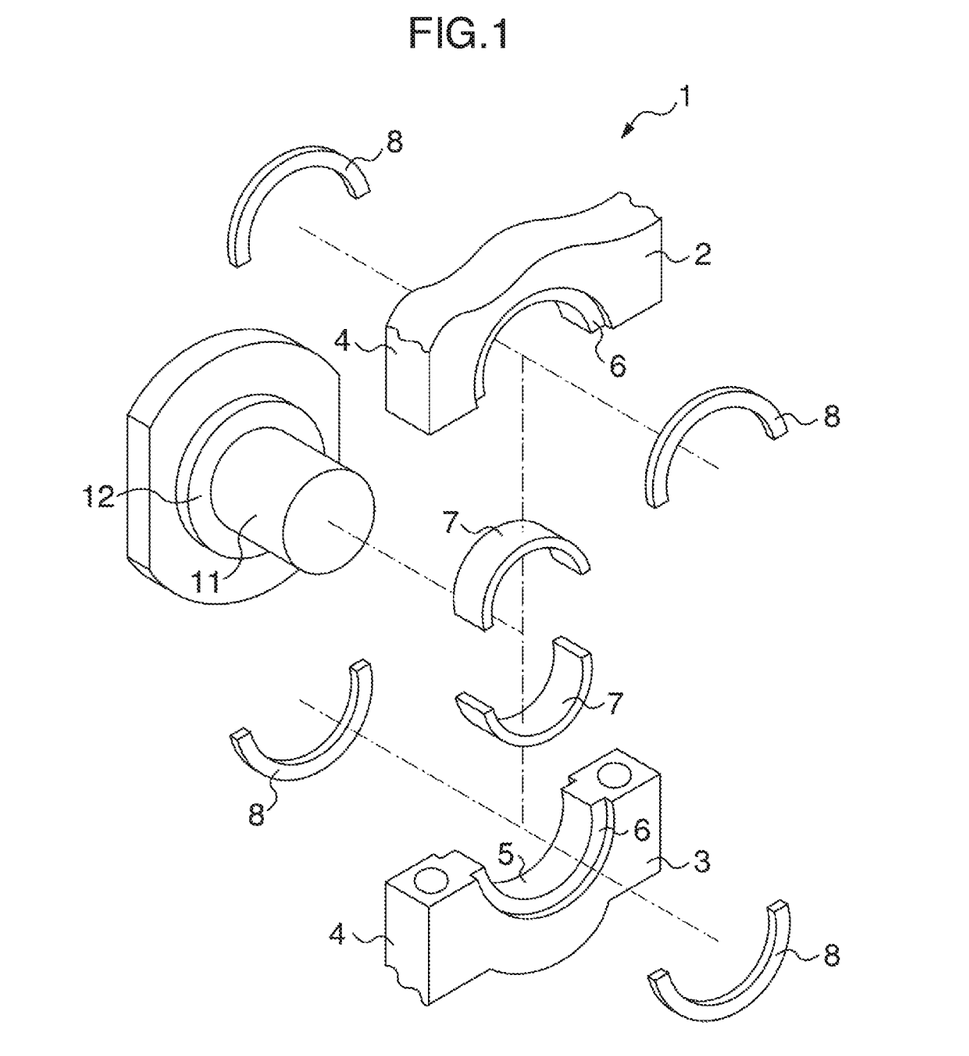
FIG. 1 is an exploded perspective view of a bearing device.
Figure 2:
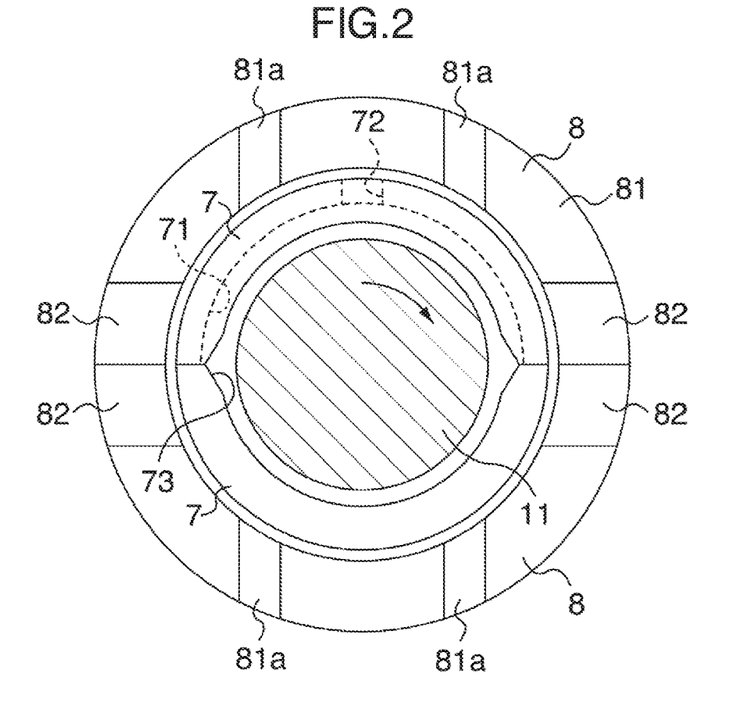
FIG. 2 is a front view of the bearing device.
Figure 3:
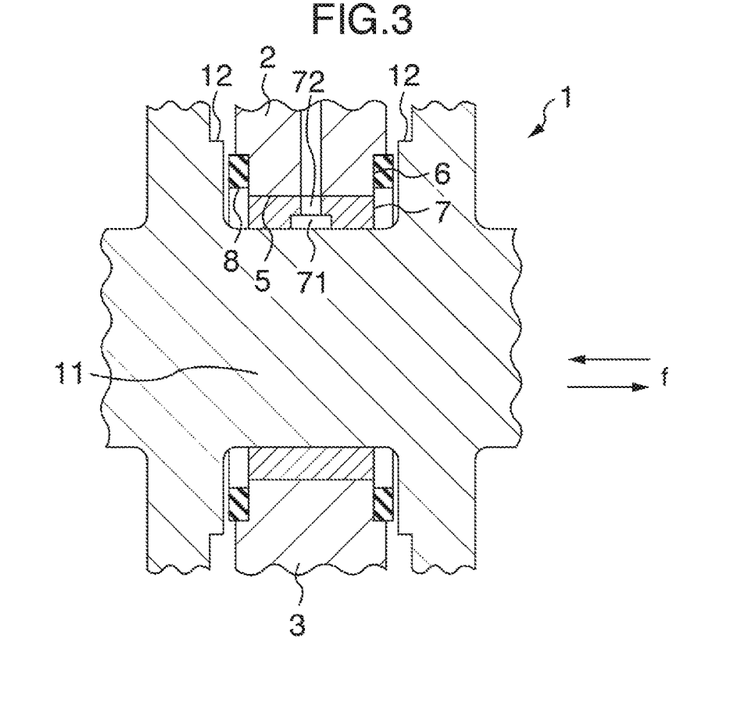
FIG. 3 is a sectional view of the bearing device in the axial direction.

First, an overall configuration of a bearing device 1 according to Embodiment 1 of the present embodiment is described by using FIGS. 1 to 3. As illustrated in FIGS. 1 to 3, a bearing hole (holding hole) 5 which is a circular hole penetrating between both side surfaces is formed in a bearing housing 4 configured by attaching a bearing cap 3 to a bottom part of a cylinder block 2, and bearing seats 6, 6 which are annularly-shaped depressions are formed at peripheral edges of the bearing hole 5 on the side surfaces. Half bearings 7, 7 which rotatably support a journal portion 11 of a crankshaft are combined into a cylindrical shape and then fitted into the bearing hole 5. Half thrust bearings 8, 8 which receive axial force f (see FIG. 3) via a thrust collar 12 of the crankshaft are combined into an annularly shape and then fitted into the bearing seats 6, 6.

Figure 11:
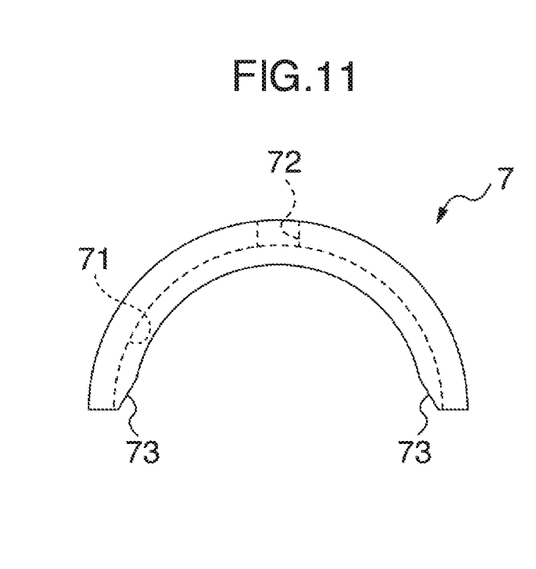
FIG. 11 is a front view of a half bearing.
Figure 12:
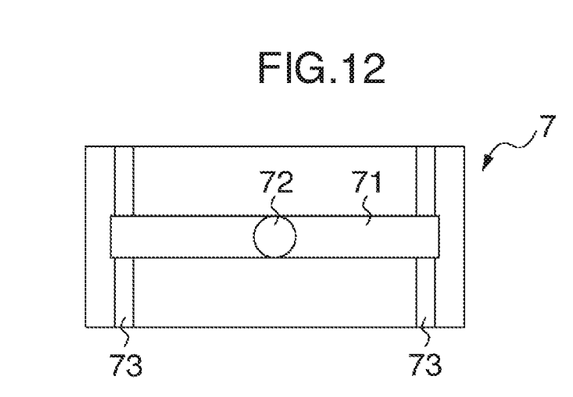
FIG. 12 is a bottom view in which the half bearing illustrated in FIG. 11 is seen from a radially inner side.

As illustrated in FIG. 2, a lubrication oil groove 71 is formed on the inner peripheral surface of the half bearing 7 on the cylinder block 2 side (upper side) of the half bearings 7 forming a main bearing, and a through-hole 72 penetrating up to an outer peripheral surface is formed in the lubrication oil groove 71 (also see FIGS. 11 and 12). It should be noted that the lubrication oil grooves 71 may be formed also in both top and bottom half bearings.

Furthermore, crush reliefs 73, 73 are formed in each of the half bearings 7 on both circumferential ends thereof, adjacent to abutment surfaces of the half bearings 7 (see FIGS. 2, 11, and 12). The crush relief 73 is a wall thickness decreasing region formed in such a way that a wall thickness of a region adjacent to the circumferential end of the half bearing 7 becomes gradually smaller toward the circumferential end. The crush relief 73 is formed with the intention of absorbing misalignment and deformation of the abutting surfaces when the pair of half bearings 7, 7 are put together.

(Configuration of Half Thrust Bearing)

Next, the configuration of the half thrust bearing 8 of Embodiment 1 is described by using FIGS. 2 to 5. The half thrust bearing 8 of the present embodiment includes a slide surface 81 (bearing surface) which is formed in a circumferentially central region and receives the axial force f, and thrust reliefs 82, 82 formed in regions adjacent to both circumferential end surfaces 83, 83. The thrust relief 82 has a flat thrust relief surface (plane) 82s. Two oil grooves 81a, 81a are formed on the slide surface 81 between the thrust reliefs 82, 82 on both sides in order to enhance oil retention performance for the lubrication oil.

Figure 4:
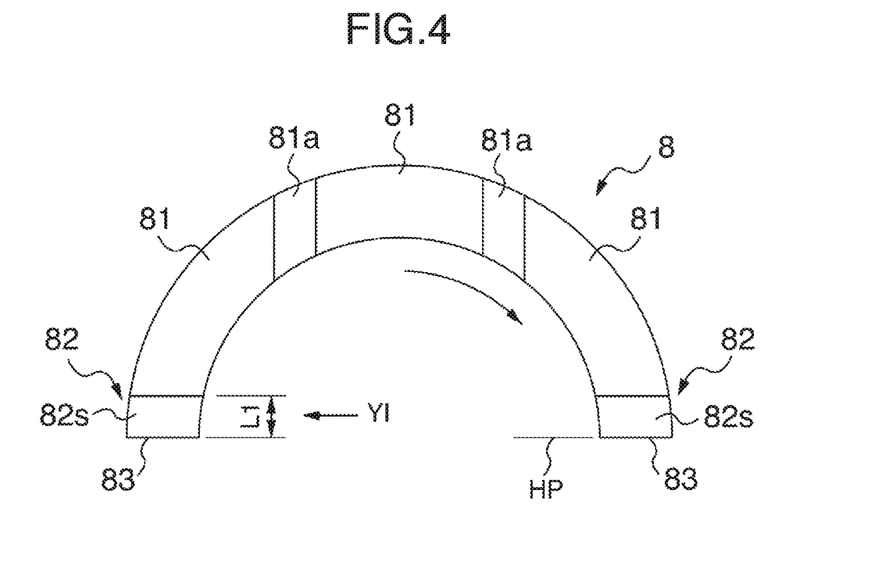
FIG. 4 is a front view of a half thrust bearing of Embodiment 1.

The thrust relief 82 is a wall thickness decreasing region of the half thrust bearing 8 that is formed on the slide surface 81 side in a region adjacent to each circumferential end surface 83 in such a way that a wall thickness T of the half thrust bearing 8 becomes gradually smaller toward the circumferential end surface 83, and extends over the entire radial length of the half thrust bearing 8. The thrust relief 82 is formed in order to ease misalignment of the circumferential end surfaces 83, 83 of the pair of half thrust bearings 8, 8 resulting from misalignment or the like when the half thrust bearings 8 are put together in the split-type bearing housing 4.

As illustrated in FIG. 4, the thrust relief 82 of the present embodiment has a thrust relief length L1 which is constant between a radially inner end and a radially outer end of the half thrust bearing 8. Particularly when used in a crankshaft (of which a journal portion has a diameter of approximately 30 to 100 mm) of a small-size internal combustion engine of an automobile or the like, the length L1 of the thrust relief 82 measured from the circumferential end surface 83 of the half thrust bearing 8 is set to 3 to 25 mm.

Here, the thrust relief length L1 of the thrust relief 82 is defined as a length measured in a perpendicular direction from a plane (thrust bearing split plane HP) including both circumferential end surfaces 83 of the half thrust bearing 8. Particularly, the thrust relief length L1 at a radially inner end of the half thrust bearing 8 is defined as a length in a perpendicular direction from the circumferential end surface 83 of the half thrust bearing 8 to a point where the thrust relief surface 82s intersects with an inner peripheral edge of the slide surface 81.

Furthermore, the thrust relief 82 of the half thrust bearing 8 is formed in such a way as to have, in the circumferential end surface 83, an axial depth RD1 which is constant between the radially inner end and the radially outer end of the half thrust bearing 8. The axial depth RD1 of the thrust relief 82 may be set to 0.1 to 1 mm.

Here, the axial depth of the thrust relief 82 means an axial distance from a plane including the slide surface 81 of the half thrust bearing 8 to the thrust relief surface 82s. In other words, the axial depth of the thrust relief 82 is a distance measured perpendicularly from an imaginary slide surface which is an extension of the slide surface 81 above the thrust relief 82, to the thrust relief surface 82s. Therefore, the axial depth RD1 of the thrust relief 82 in the circumferential end surface 83 of the half thrust bearing 8 is defined as a distance from the imaginary slide surface which is the extension of the slide surface 81, to an intersection point of the thrust relief surface 82s and the circumferential end surface 83.

Figure 6:
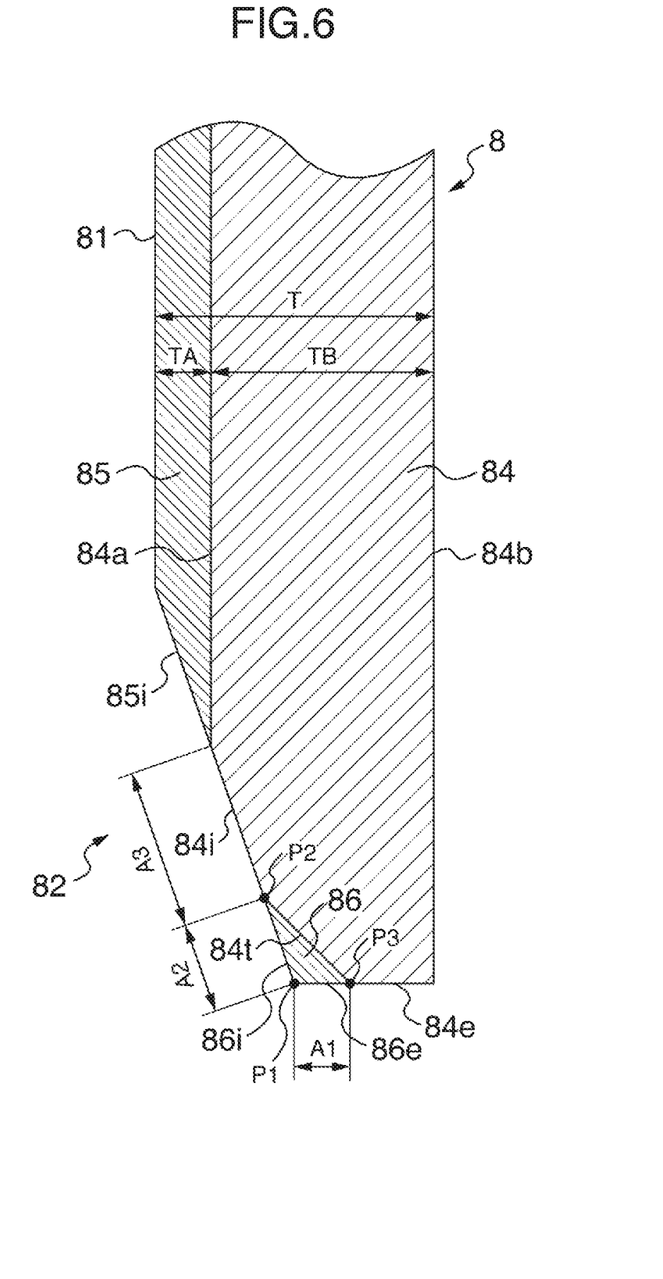
FIG. 6 is a sectional view of the vicinity of the circumferential end in the axial direction illustrated in FIG. 5.

The half thrust bearing 8 is formed into a semi-annularly shaped flat plate by use of a bimetal in which a thin bearing alloy layer 85 is bonded to a back metal layer 84 made of an Fe alloy (also see FIG. 6). A Cu bearing alloy, an Al bearing alloy, or the like can be used as the bearing alloy layer 85 defining the slide surface 81, while steel, stainless steel, or the like can be used as an Fe alloy of the back metal layer 84. The bearing alloy layer 85 is lower in hardness (namely, softer) than the back metal layer 84 made of the Fe alloy, and is therefore larger in elastic deformation amount than the back metal layer 84 when receiving external force.

The back metal layer 84 includes two surfaces, i.e., a first surface 84a to which the bearing alloy layer 85 is bonded, and a second surface 84b parallel to the first surface 84a that forms a rear surface of the half thrust bearing 8. Further, the back metal layer 84 includes an exposed slant surface 84i extending to incline from the first surface 84a in such a way as to form a part of the thrust relief surface 82s, an exposed end face 84e adjacent to the second surface 84b that forms a part of the circumferential end surface 83 of the half thrust bearing 8, and a transition surface 84t formed between the exposed slant surface 84i and the exposed end face 84e.

As illustrated in FIG. 6, the half thrust bearing 8 further includes a cover member 86 provided so as to cover the transition surface 84t of the back metal layer 84. This cover member 86 includes a cover slant surface 86i extending in the same plane as the exposed slant surface 84i of the back metal layer 84 and thereby forming a part of the thrust relief surface 82s, and a cover end surface 86e extending in the same plane as the exposed end face 84e of the back metal layer 84 and thereby forming a part of the circumferential end surface 83 of the half thrust bearing 8. The cover member 86 is formed from the same bearing alloy as the bearing alloy layer 85.

The bearing alloy layer 85 includes a bearing alloy slant surface 85i extending to incline from the slide surface 81 and thereby forming at least a part of the thrust relief surface 82s.

In Embodiment 1, the bearing alloy slant surface 85i, the exposed slant surface 84i, and the cover slant surface 86i are aligned without any step to configure the thrust relief surface 82s, and the exposed end face 84e and the cover end surface 86e are aligned without any step to configure the circumferential end surface 83.

It should be noted that the circumferential end surface 83 of the half thrust bearing 8 may be formed, for example, so that the exposed end face 84e is flat (or flush) with respect to the cover end surface 86e on an adjacent side of the exposed end face 84e to the transition surface 84t, but is set back or away from the flat surface on an adjacent side of the exposed end face 84e to the second surface 84b.

Furthermore, from the viewpoint of actual manufacture, the shape of the thrust relief surface 82s may be a slightly bent curve in a circumferential section perpendicular to the slide surface 81.

More specifically, in a section perpendicular to the slide surface 81 and the circumferential end surface 83 of the half thrust bearing 8, the shape of the cover member 86 is defined as a part enclosed by an intersection point P1 provided when extending the exposed slant surface 84i and the exposed end face 84e of the back metal layer 84, an intersection point P2 of the exposed slant surface 84i and the transition surface 84t of the back metal layer 84, and an intersection point P3 of the transition surface 84t and the exposed end face 84e of the back metal layer 84.

An axial length A1 of the cover member 86 which is a distance from the intersection point P1 to the intersection point P3 is preferably 0.2 to 1.5 mm, and in particular preferably 10 to 40% of the length A of the circumferential end surface 83 of the half thrust bearing 8.

Moreover, a length (thickness) A2 of the cover member 86 along the cover slant surface 86i which is a distance from the intersection point P1 to the intersection point P2 is preferably 0.2 to 1 mm.

It should be noted that the cover member 86 is provided over the entire radial length of the circumferential end surface 83 of the half thrust bearing 8.

Further, in a section perpendicular to the slide surface 81 and the circumferential end surface 83 of the half thrust bearing 8, an exposure length A3 of the exposed slant surface 84i of the back metal layer 84 is preferably 1 to 10 mm.

The transition surface 84t is formed as a flat surface in Embodiment 1, but may be formed as a curved surface which is convex toward the cover member 86, i.e., a curved surface with a curvature radius having a curvature center on a side opposite to the cover member 86. Alternatively, the transition surface 84t may be formed from a plurality of planes or a discontinuous surface so as to be a convex shape toward the cover member 86 as a whole.

Moreover, a corner between the thrust relief surface 82s and the circumferential end surface 83 may be made into a round shape (R-shape).

Figure 7:
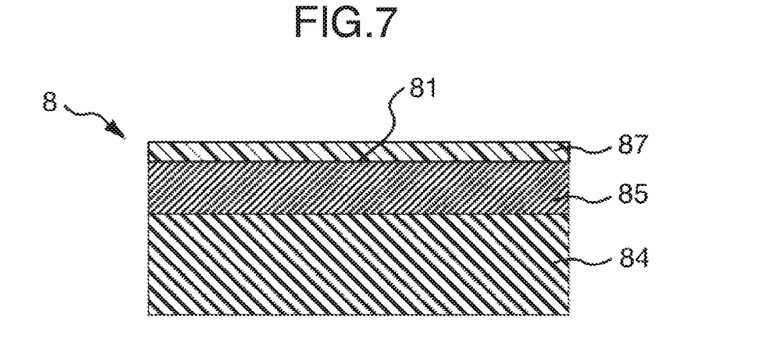
FIG. 7 is a sectional view of a half thrust bearing in which an overlay layer is formed on a bearing alloy layer.

It should be noted that, as illustrated in FIG. 7, an overlay layer 87 may be formed on the slide surface 81 of the bearing alloy layer 85 in an axial section of the half thrust bearing 8. As the overlay layer 87, it is possible to use a metal or an alloy such as Sn, an Sn alloy, Bi, a Bi alloy, Pb, or a Pb alloy, or a resin slide material. The resin slide material is formed from a resin binder and a solid lubricant. Although a known resin may be used as a resin binder, it is preferable to use one or more kinds selected from the group consisting of highly heat-resistant polyamide-imide, polyimide, and polybenzimidazole. It is also possible to use, as a resin binder, a resin composition in which a highly heat-resistant resin including one or more kinds selected from the group consisting of polyamide-imide, polyimide, and polybenzimidazole is mixed with 1 to 25 volume percent of resin including one or more kinds selected from the group consisting of polyamide, epoxy, and polyethersulfone, or a polymer-alloyed resin composition. As a solid lubricant, it is possible to use molybdenum disulfide, tungsten disulfide, graphite, polytetrafluoroethylene, boron nitride, or the like. The addition ratio of a solid lubricant to the resin slide material is preferably 20 to 80 volume percent. Moreover, in order to enhance wear resistance of the resin slide material, 0.1 to 10 volume percent of hard particles of ceramics, an intermetallic compound, or the like may be contained in the resin slide material.

The overlay layer 87 may be applied not only to the slide surface 81 of the bearing alloy layer 85 that receives axial the force f of the crankshaft, but also to the thrust relief surface 82s, a surface of the oil groove 81a, an outside diameter surface, an inside diameter surface, a rear surface, a circumferential end surface and the like of the half thrust bearing 8. The thickness of the overlay layer 87 is 0.5 to 20 μm, and preferably 1 to 10 μm.

It should be noted that, in the present description, the slide surface 81, the thrust relief surface 82s, the rear surface 84b, and the circumferential end surface 83 are defined as surfaces in the case where the overlay layer 87 is not given.

Effects According to Embodiment 1

As described above, substantially simultaneously with the input of the axial force f from the crankshaft to the slide surface 81 of the half thrust bearing 8, the circumferential end surface 83 of one half thrust bearing 8 collides with the circumferential end surface 83 of the other half thrust bearing 8, so that impact load is applied to the proximities of the circumferential end surfaces 83 of the half thrust bearings 8. It should be noted that, in contrast to the configuration in the present embodiment, if the bearing seat 6 which is a annularly shaped depression at the peripheral edge of the bearing hole 5 is formed only on the side surface of the cylinder block 2 of the bearing housing 4 which is configured by attaching the bearing cap 3 to the bottom part of the cylinder block 2 illustrated in FIG. 1, and therefore a single half thrust bearing is disposed on one side surface of the bearing housing 4, the circumferential end surface 83 of the half thrust bearing 8 collides with an end surface (split surface) of the bearing cap 3, and thereby the impact load is applied to the proximity of the circumferential end surface 83 of the half thrust bearing 8.

However, in the present embodiment, the cover member 86 made of the same bearing alloy as the bearing alloy layer 85 is formed on an adjacent side of the circumferential end surface 83 to the thrust relief 82, so that this member receives the impact load and is therefore elastically deformed. Accordingly, the load applied to a region of the back metal layer 84 adjacent to the bearing alloy layer 85 is eased in the circumferential end surface 83. On the other hand, on a rear surface side (a side located apart from the thrust relief 82) of the circumferential end surface 83, the exposed surface 84e of the back metal layer 84 which is less easily elastically deformed than the cover member 86 is exposed, so that the impact load is mainly applied to a region of the back metal layer 84 located apart from the thrust relief surface 82s. Moreover, on the thrust relief surface 82s, the exposed slant surface 84i of the back metal layer 84 is formed adjacent to the cover member 86 and therefore the cover member 86 is located apart from the bearing alloy slant surface 85i (i.e., the bearing alloy layer 85). Thus, the impact load is not easily propagated to the bearing alloy layer 85 in a region of the thrust relief 82 and a region of the slide surface 81 adjacent to the thrust relief 82, so that fatigue does not easily occur in the bearing alloy layer 85 in these regions.

It should be noted that, in contrast to the present embodiment, if the cover member 86 is formed on the entirety (entire surface) of the circumferential end surface 83 of the half thrust bearing 8, the impact load is evenly propagated to the back metal layer in the region of the circumferential end surface independently of the position in a thickness direction (axial direction) thereof in the same manner as a conventional half thrust bearing, so that the impact load is propagated also to the back metal layer in the region of the thrust relief and in the region of the slide surface adjacent to the thrust relief, resulting in easy occurrence of the fatigue in the bearing alloy layer adjacent thereto.

Also if the axial length A1 of the cover member 86 is excessively large, the rate of the surface (exposed end face 84e) of the back metal layer which mainly supports the impact load in the circumferential end surface 83 becomes low, so that large impact load is applied also to the surface (cover end surface 86e) of the cover member 86. Because the large impact load is applied to the surface of the cover member 86 in this way, the fatigue easily occurs in the bearing alloy of the cover member.

Further, if the axial length A1 and/or thickness A2 of the cover member 86 are excessively small, elastic deformation of the bearing alloy for easing the impact load becomes small, so that ease of the impact load is insufficient. Therefore, large impact load is propagated to the back metal layer 84 in the region of the thrust relief 82 and in the region of the slide surface 81 adjacent to the thrust relief 82, and the fatigue easily occurs in the bearing alloy layer 85.

During the operation of an internal combustion engine, if deflection of a crankshaft occurs, a thrust collar 12 of the crankshaft may contact the thrust relief surface 82s. Accordingly, if the exposure length A3 of the exposed slant surface 84i in the thrust relief surface 82s is excessively large, the exposed slant surface 84i and the thrust collar 12 of the crankshaft become easily in contact with each other, and there is a possibility that seizure occurs.

Contrarily to this, if the exposure length A3 of the exposed slant surface 84i is excessively small, there is a possibility that the impact load received by the cover member 86 may be propagated to the back metal layer 84 in the region of the thrust relief 82 and the region of the slide surface 81 adjacent to the thrust relief 82.

(Dimensions of Bearing Alloy Layer and Back Metal Layer)

Figure 5:
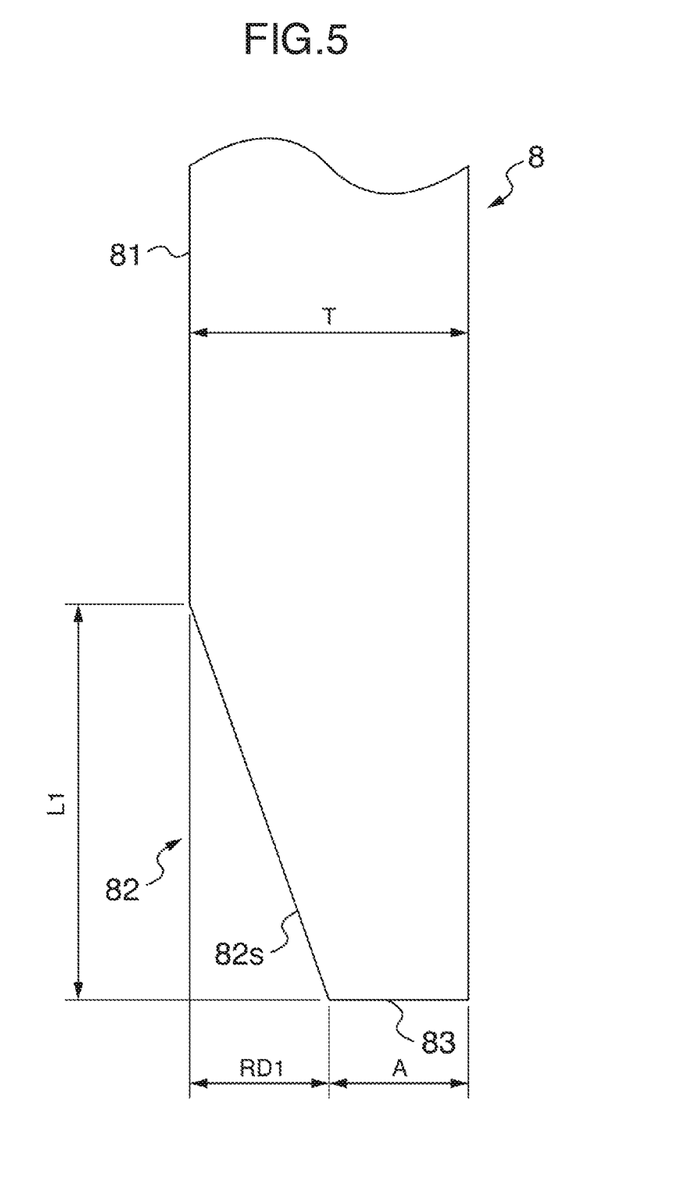
FIG. 5 is an enlarged side view in which the vicinity of a circumferential end of the half thrust bearing of Embodiment 1 is seen from the inside (a direction of the arrow Y1 in FIG. 4)

FIG. 5 is an enlarged side view in which the vicinity of a circumferential end of the half thrust bearing in Embodiment 1 is seen from the inside (a direction of the arrow YI in FIG. 4). FIG. 6 is a sectional view in the axial direction showing the vicinity of the circumferential end illustrated in FIG. 5.

When used in a crankshaft (of which a journal portion has a diameter of approximately 30 to 100 mm) of a small-size internal combustion engine of an automobile or the like, a thickness T of the half thrust bearing 8 is 1.5 to 3.5 mm, a thickness TA of the bearing alloy layer 85 is 0.1 to 0.7 mm, and a thickness TB of the back metal layer 84 is 1.1 to 3.2 mm, in a region where the slide surface 81 is formed. In the region where the slide surface 81 is formed, each of the thickness TA of the bearing alloy layer 85 and the thickness TB of the back metal layer 84 is preferably constant.

Moreover, the thrust relief 82 of the half thrust bearing 8 is formed so that the wall thickness of the half thrust bearing 8 becomes gradually smaller toward the circumferential end surface 83. An axial length A of the half thrust bearing 8 in the circumferential end surface 83, i.e., an axial distance A from the intersection point P1 provided when extending the exposed slant surface 84i and the exposed end face 84e of the back metal layer 84, to the second surface 84b is 0.6 to 2.7 mm (Manufacture of Half Thrust Bearing)

The half thrust bearing 8 of the present embodiment is molded by cutting a planar multi-layered slide material consisting of the back metal layer 84 and the bearing alloy layer 85 into a semi-annular shape by using a pair of male and female dies and a pressing machine. In general, a clearance between cutting portions of the pair of male and female dies has been made narrow in order to reduce burrs resulting from the cutting. However, in the manufacture of the half thrust bearing 8 of the present embodiment, although the clearance between the cutting portions at an inner peripheral surface and an outer peripheral surface having a semi-annular shape is made narrow as with the conventional manufacture, the clearance at the circumferential end is made wider than the conventional manufacture. Consequently, during press-molding, the bearing alloy layer 85 on the back metal layer 84 in the proximity of the circumferential end surface 83 is cut while plastically flowing in the clearance in such a way as to cover the side surface (circumferential end surface 83) of the back metal layer 84, and then adheres to a part of the circumferential end surface 83. Further, by forming the thrust relief surface 82s through cutting operation, there are provided the exposed slant surface 84i and the transition surface 84t of the back metal layer 84, and the cover member 86 made of a bearing alloy on the transition surface 84t.

It should be noted that, although the bearing device 1 of the type in which the half bearing 7 and the half thrust bearing 8 are separated has been described in the present embodiment, the present invention is not limited thereto, and is also applicable to the bearing device 1 of the type in which the half bearing 7 and the half thrust bearing 8 are integrated.

While Embodiment 1 of the present invention has been described in detail above with reference to the drawings, a specific configuration is not limited to this embodiment, and degrees of changes in design that do not depart from the spirit of the present invention fall within the present invention.

Embodiment 2

Figure 8:
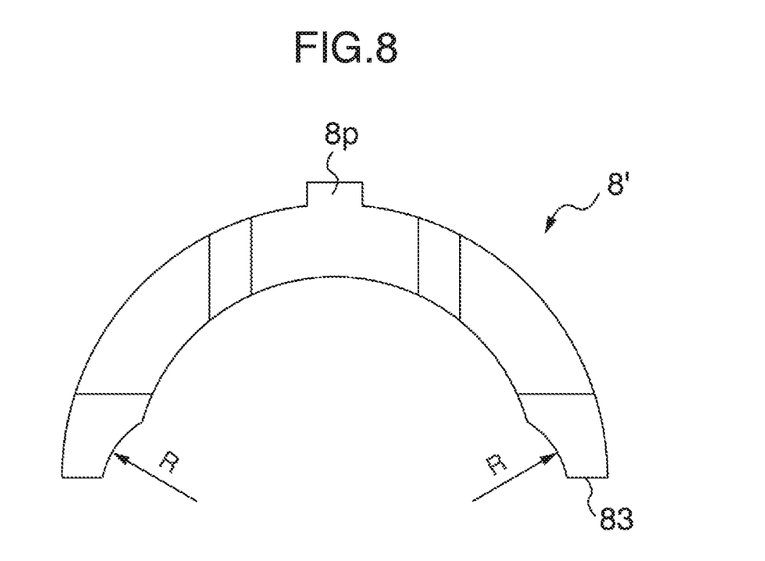
FIG. 8 is a front view of a half thrust bearing of Embodiment 2.
Figure 9:
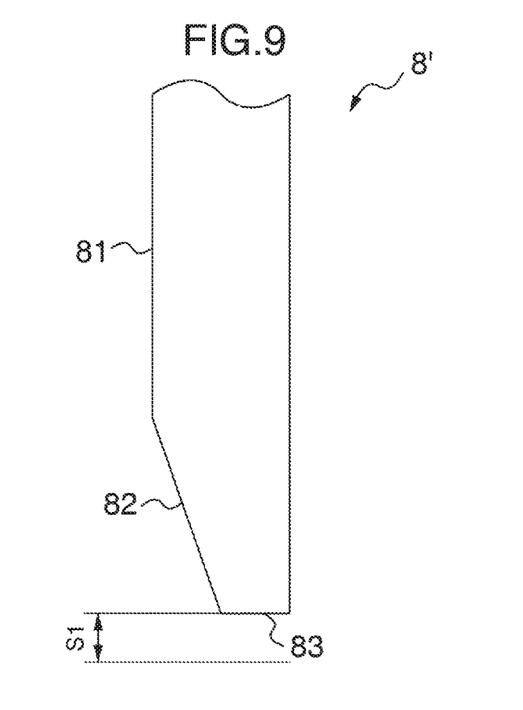
FIG. 9 is an enlarged side view in which the vicinity of a circumferential end of the half thrust bearing of Embodiment 2 is seen from the inside.

For example, as illustrated in FIGS. 8 and 9, the present invention can be also applied to a half thrust bearing 8' including a projection 8p projecting toward a radially outer side at a circumferentially central portion thereof, for the purpose of positioning and anti-rotation. A circumferential length of this half thrust bearing 8' may be shorter by a predetermined length S1 than the half thrust bearing 8 illustrated in Embodiment 1. Moreover, the half thrust bearing 8' may be cut to have an arc-shape with a radius R in the inner peripheral surface in the vicinity of the circumferential end surface 83. Similarly, it is also possible to form a chamfer extending in the circumferential direction on a radially outer edge or a radially inner edge on the slide surface 81 side of the half thrust bearing 8'.

Embodiment 3

Figure 10:
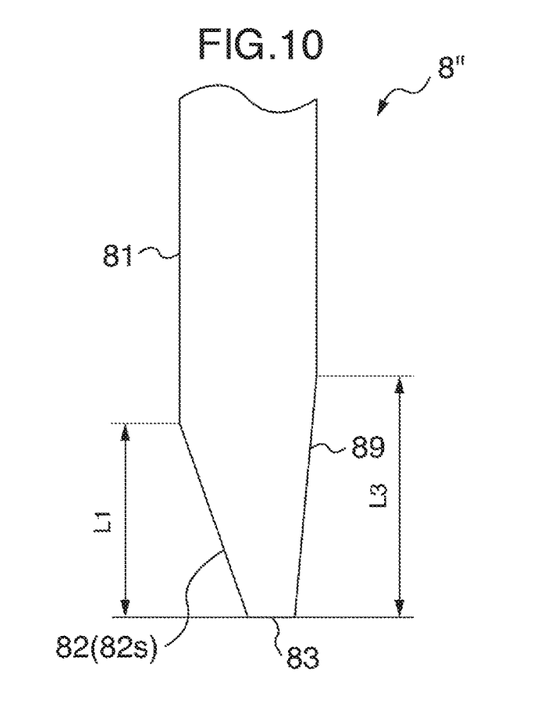
FIG. 10 is an enlarged side view in which the vicinity of a circumferential end of a half thrust bearing of Embodiment 3 is seen from the inside.

As illustrated in FIG. 10, a half thrust bearing 8" according to Embodiment 3 may have a rear surface relief 89 having a shape resembling that of the thrust relief 82 adjacent to both circumferential ends of a rear surface (the second surface 84b of the back metal layer 84) on a side opposite to the slide surface 81. In this case, a thickness of the back metal layer 84 is defined as a thickness measured from the second surface in the case that the rear surface relief 89 is not formed.

Alternatively, the rear surface relief 89 may be configured in such a way as to have a plane parallel to the slide surface 81.

It should be noted that, as illustrated in FIG. 10, a relief length L3 of the rear surface relief 89 is larger than the thrust relief length L1 of the thrust relief 82 described above, but is not limited thereto, and may be the same as the thrust relief length L1, or may be smaller than the thrust relief length L1.

Furthermore, although four half thrust bearings 8 are used in the bearing device 1 in Embodiment 1, the present invention is not limited thereto, and desired advantageous effects can be obtained by using at least one half thrust bearing 8 according to the present invention. Moreover, the half thrust bearing 8 according to the present invention and a conventional thrust bearing may be paired with each other and thus used as an annularly shaped thrust bearing. Further, in the bearing device 1 according to the present invention, the half thrust bearing 8 may be integrally formed at one or both axial end surfaces of the half bearing 7 which rotatably bears a crankshaft.

The invention claimed is:

1. A semi-annularly shaped half thrust bearing for receiving axial force of a crankshaft of an internal combustion engine, the half thrust bearing comprising a back metal layer made of an Fe alloy that comprises a first surface and a second surface parallel to the first surface, and a bearing alloy layer provided on the first surface of the back metal layer that defines a slide surface of the half thrust bearing to be parallel to the first surface, the half thrust bearing further comprising two thrust reliefs, each thrust relief comprising a thrust relief surface formed so that a wall thickness of the half thrust bearing becomes smaller from the slide surface toward the circumferential end surface, one of the two thrust reliefs formed adjacent to one of two circumferential end surfaces of the half thrust bearing and the other thrust relief formed adjacent to the other circumferential end surface, wherein the back metal layer further comprises an exposed end face forming at least a part of the circumferential end surface of the half thrust bearing, an exposed slant surface extending to incline from the first surface and forming at least a part of the thrust relief surface, and a transition surface formed between the exposed end face and the exposed slant surface, and the transition surface is covered with a cover member made of the same bearing alloy as the bearing alloy layer, the cover member comprising a cover end surface forming at least a part of the circumferential end surface of the half thrust bearing and a cover slant surface forming at least a part of the thrust relief surface.

2. The half thrust bearing according to claim 1, wherein an axial length (A1) of the cover end surface in the circumferential end surface of the half thrust bearing is 0.2 to 1.5 mm.

3. The half thrust bearing according to claim 1, wherein an axial depth (RD1) of the thrust relief from the slide surface in the circumferential end surface of the half thrust bearing is constant between a radially inner end and a radially outer end of the half thrust bearing, and 0.1 to 1 mm.

4. The half thrust bearing according to claim 1, wherein a length (L1) of the thrust relief from the circumferential end surface of the half thrust bearing is constant between a radially inner end and a radially outer end of the half thrust bearing, and 3 to 25 mm.

5. The half thrust bearing according to claim 1, wherein at least the slide surface is covered with an overlay layer.

6. The half thrust bearing according to claim 1, wherein the bearing alloy layer comprises a bearing alloy slant surface extending to incline from the slide surface and forming at least a part of the thrust relief surface.

7. The half thrust bearing according to claim 6, wherein the bearing alloy slant surface, the exposed slant surface, and the cover slant surface extend at least partly in the same plane, and the exposed end face and the cover end surface extend at least partly in the same plane.

* * * * *